(12) United States Patent
Ozaki et al.

(10) Patent No.: US 7,882,214 B2
(45) Date of Patent: Feb. 1, 2011

(54) COMMUNICATION SYSTEM AND SESSION ESTABLISHMENT METHOD

(75) Inventors: Naohiro Ozaki, Fukuoka (JP); Akio Koga, Fukuoka (JP); Tomoyuki Furutono, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 876 days.

(21) Appl. No.: 11/244,109

(22) Filed: Oct. 6, 2005

(65) Prior Publication Data
US 2006/0294242 A1    Dec. 28, 2006

(30) Foreign Application Priority Data
Jun. 24, 2005   (JP)  ............... 2005-184249

(51) Int. Cl.
*G06F 15/173*     (2006.01)
(52) U.S. Cl. ............... 709/224; 709/228; 709/204; 709/206; 709/207; 709/227
(58) Field of Classification Search ............ 709/228, 709/204
See application file for complete search history.

(56) References Cited

U.S. PATENT DOCUMENTS

| | | | | |
|---|---|---|---|---|
| 6,005,869 | A * | 12/1999 | Sakai et al. | 370/452 |
| 6,157,829 | A * | 12/2000 | Grube et al. | 455/414.1 |
| 6,327,353 | B1 * | 12/2001 | Fukuzawa et al. | 379/201.01 |
| 6,564,261 | B1 * | 5/2003 | Gudjonsson et al. | 709/227 |
| 6,826,616 | B2 * | 11/2004 | Larson et al. | 709/228 |
| 6,937,571 | B1 * | 8/2005 | Acharya et al. | 370/246 |
| 2001/0029496 | A1 * | 10/2001 | Otto et al. | 705/74 |
| 2004/0199402 | A1 * | 10/2004 | Walker et al. | 705/1 |
| 2004/0205198 | A1 * | 10/2004 | Zellner et al. | 709/228 |
| 2004/0260948 | A1 | 12/2004 | Miyata et al. | |

(Continued)

FOREIGN PATENT DOCUMENTS

EP     984608 A2 *   3/2000

(Continued)

OTHER PUBLICATIONS

Handley et al; Network Working Group, Request for Comments: 2543, SIP: Session Initiation Protocol; Mar. 1999, pp. 1-153.*

*Primary Examiner*—Aaron Strange
*Assistant Examiner*—Jonathan Bui
(74) *Attorney, Agent, or Firm*—Hanify & King, P.C.

(57) ABSTRACT

A communication system capable of securely preventing illegal use of addresses and enhancing confidentiality of communication. Based on an originating-side real address which is the real address of an originating-side client terminal and specific information included in a registration message, a conversion data generator generates conversion data which the local server alone can convert to a receiving-side real address which is the real address of a receiving-side client terminal, and transmits the conversion data to the originating-side client terminal. A session controller receives a first session establishment request message, obtains the receiving-side real address from the conversion data and the originating-side real address included in the first session establishment request message, and transmits a second session establishment request message to the receiving-side real address, whereby a session is established between the originating-side and receiving-side client terminals without directly using the originating-side and receiving-side real addresses uniquely assigned on the network.

7 Claims, 14 Drawing Sheets

U.S. PATENT DOCUMENTS

| | | | |
|---|---|---|---|
| 2005/0131989 A1* | 6/2005 | Beckmann et al. | 709/201 |
| 2005/0172025 A1* | 8/2005 | Colas et al. | 709/226 |
| 2005/0204060 A1* | 9/2005 | Maekawa et al. | 709/245 |
| 2005/0246419 A1* | 11/2005 | Jaatinen | 709/204 |
| 2005/0286498 A1* | 12/2005 | Rand et al. | 370/352 |
| 2006/0165068 A1* | 7/2006 | Dalton et al. | 370/352 |
| 2007/0118884 A1* | 5/2007 | Ozaki et al. | 726/5 |
| 2008/0125123 A1* | 5/2008 | Dorenbosch et al. | 455/436 |

FOREIGN PATENT DOCUMENTS

JP  2005-038393 A  2/2005

* cited by examiner

| | | T1 |
|---|---|---|
| 1×× | PROVISIONAL RESPONSE | REQUEST IS BEING PERFORMED |
| 2×× | SUCCESS | REQUEST WAS PROPERLY ACCEPTED AND EXECUTED |
| 3×× | REDIRECT | EXTRA STEP IS NEEDED TO COMPLETE REQUEST |
| 4×× | CLIENT ERROR | REQUEST CANNOT BE EXECUTED BECAUSE OF ERROR IN REQUEST |
| 5×× | SERVER ERROR | SERVER ERRED |
| 6×× | FAILURE | REQUEST CANNOT BE PERFORMED BY SERVER |

FIG. 3

COMMUNICATION SYSTEM AND SESSION ESTABLISHMENT METHOD

CROSS-REFERENCE TO RELATED APPLICATIONS

This application is based upon and claims the benefits of priority from the prior Japanese Patent Application No. 2005-184249, filed on Jun. 24, 2005, the entire contents of which are incorporated herein by reference.

BACKGROUND OF THE INVENTION

1. Field of the Invention

The present invention relates to communication systems and session establishment methods, and more particularly, to a communication system for performing communication with a session established between terminals via a network and a session establishment method for establishing a session between terminals via a network.

2. Description of the Related Art

In recent years, IP (Internet Protocol) telephony services (Internet telephony services) permitting voice telephony over an IP network have become available. IP telephony can be provided at low call rates, compared with the existing telephony, and thus is expected to come into wide use with the advance in the network technologies in future.

Unlike ordinary telephone networks in which the connection with a called party is established prior to communication, IP networks generally adopt a connectionless communication form in which information is transmitted directly to the called party without the connection being ascertained.

Accordingly, to implement telephone communication in connectionless communication environments such as IP networks, it is necessary to employ a protocol (connection-type protocol) which allows communication to be initiated after the connection with a called party is ascertained, and a protocol called SIP (Session Initiation Protocol), for example, is used in IP telephony services.

SIP is a connection-type signaling protocol which, using IP packets, initiates and terminates voice calls as well as multimedia communication of, for example, the video of videophones between terminals connected to IP networks.

Electronic mail, for example, is one-way communication of information, and therefore, when email is transmitted, the transmitting-side application and the receiving-side application need not be associated with each other (session need not be established).

In the case of IP telephone calls, on the other hand, it is necessary that the calling party and the called party should both be on the phone at the same time. Thus, to ascertain that both parties are on the phone, for example, the IP telephony applications of the calling and called parties need to be associated with each other through a series of steps: "notification of dialing by the calling side"→"ringing of the called side"→"answering by the called side".

Such "association (connective relation)" between the applications over the Internet is called session, and call control including the initiation of a session is taken care of by SIP.

FIG. 14 shows a network configuration adapted for IP telephony. An IP network 100 includes a SIP server 101, and client terminals 102 and 103 are connected to the IP network 100. The SIP server 101 is a device for controlling the connection/disconnection of a session between the client terminals 102 and 103.

The client terminals 102 and 103, which make use of IP telephony service, are respectively assigned unique SIP-URIs (SIP-Uniform Resource Identifiers) as their telephone numbers (communication resource identifiers) to be uniquely identified on the network, and a session is established based on the SIP-URIs.

When the client terminal 102 as an originating side makes an IP telephone call to the client terminal 103 as a receiving side, first, the originating-side client terminal 102 connects with the receiving-side client terminal 103 by using SIP (signaling protocol).

At this time, the SIP server 101 receives a session establishment request from the originating-side client terminal 102, whereupon the SIP server identifies the receiving-side client terminal 103 from the telephone number (SIP-URI) specified as a target of session request by the originating-side client terminal 102 and transfers the session establishment request from the originating-side client terminal 102 to the receiving-side client terminal 103.

After a session is established, voice data and the like are exchanged by means of a streaming protocol such as RTP (Real-time Transport Protocol) and RTCP (Real-time Transport Control Protocol).

SIP itself provides only the basic call control function such as the initiation, change, and disconnection of sessions. Accordingly, to provide an encryption function for secure communication via sessions, SSL (Secure Socket Layer) or TLS (Transport Layer Security), for example, is used as in HTTP (Hyper-Text Transfer Protocol). Also, as a protocol for describing sessions, SDP (Session Description Protocol) is used, and to provide a transfer function for data requiring simultaneity such as voice and video, a transport protocol such as RTP or RTCP is used.

Thus, SIP is a protocol for performing only the basic session control and is used in combination with a plurality of other protocols so that the functions thereof may complement one another to realize communication between clients.

SIP imposes no restrictions on the type of data to be exchanged via sessions and, therefore, has a wide range of application. For example, IP telephony can be implemented by exchanging voice between client applications via sessions controlled by SIP, and video telephony can be implemented by exchanging voice and video via such sessions.

Since SIP is simple, highly expansible and is designed so as to make good use of the existing protocols, a variety of uses are considered as possible applications requiring real-time functionality such as video telephony, video chat and videoconferencing, besides IP telephony. SIP is therefore attracting attention as a potential major protocol for realizing real-time communication over IP networks.

Meanwhile, when information is communicated via networks, it is necessary that personal information should be properly managed. As such information management techniques, a technique is known in which set values relating to permission of personal information disclosure to third parties are hierarchically managed in accordance with disclosure levels (e.g., Unexamined Japanese Patent Publication No. 2005-38393 (paragraph nos. [0024] to [0042], FIG. 1)).

When IP telephony communication is established between clients, the originating-side client can establish communication without notifying the receiving-side client of the actual telephone number (SIP-URI), which is personal information on the originating-side client, by using the originator number blocking setting as provided by RFC3325 (Private Extensions to SIP for Asserted Identity within Trusted Networks) or draft-ietf-sip-privacy-02 (SIP Extensions for Caller Identity and Privacy), for example.

However, the telephone number of the receiving-side client as the called party must always be specified at the time of requesting session establishment, and it is therefore necessary that the originating-side client should know the telephone number of the receiving-side client. Conventionally, therefore, users of IP telephony services are eventually compelled to disclose their telephone numbers to each other. However, some users may leak other users' telephone numbers, creating the possibility of malicious attacks. Accordingly, users must refrain from thoughtlessly disclosing their telephone numbers to other people than acquaintances.

Also, if a user's telephone number is leaked, the telephone number needs to be changed, and this forces the user to take the trouble to notify all of the clients who already know the leaked telephone number that the current telephone number will be changed.

Meanwhile, as illegal use prevention services for electronic mail, there have been developed anti-spam mail services enabling setting of conditional mail addresses (e.g., in Japan, "privango" mail service), wherein a temporary mail address linked to the user's real mail address is issued by an issuing server and the conditions for using the temporary mail address are set such that, for example, mail from only a specified mail address is accepted for only a limited term of use.

Such mail services are used in the following manner: Usually, when purchasing goods via the Internet, for example, the user needs to register his/her mail address on the corresponding Web site. In such cases, the user registers, on the Web site, the conditional mail address (temporary mail address issued by the issuing server) with respect to which the user's desired term of use and the user's designated mail address are specified, instead of the real mail address.

Thus, even if the mail address registered on the Web site is leaked because of illegal act or the like, all mail directed to that address is blocked by the mail server after a lapse of the set term of use. Also, since the sender's mail address is specified, all mail from addresses other than the specified sender's mail address is blocked by the mail server.

The use of such services makes it unnecessary for the user to disclose his/her real mail address to other people so that the user can make his/her mail address (conditional mail address) known without anxiety even to a person he/she meets for the first time.

However, the conditional mail address issued by the issuing center is composed of a meaningless random character string, which is difficult to remember. Accordingly, the user may feel reluctant to use the mail address or feel it troublesome to tell the mail address to other people. Further, if the issued mail addresses leak out, mail directed to the leaked mail addresses can be blocked by the mail server, but the load on the issuing center or the network increases because increased mail is sent to the center.

According to the aforementioned conventional technique (Unexamined Japanese Patent Publication No. 2005-38393), personal information is hierarchically managed by a database in accordance with the disclosure levels, and thus, the technique is not suited for the protection of real mail addresses etc. which are very likely to leak out during the call control.

SUMMARY OF THE INVENTION

The present invention was created in view of the above circumstances, and an object thereof is to provide a communication system which permits a call to be established between clients without making the clients aware of real addresses uniquely assigned thereto, thereby securely preventing illegal use of the real addresses and enhancing confidentiality.

Another object of the present invention is to provide a session establishment method which permits a session to be established between clients without making the clients aware of real addresses uniquely assigned thereto, thereby securely preventing illegal use of the real addresses and enhancing confidentiality.

To achieve the object, there is provided a communication system for performing communication with a session established between terminals via a network. The communication system comprises a receiving-side client terminal, an originating-side client terminal which is to establish a session with the receiving-side client terminal, and a communication server located within the network for establishing the session. The originating-side client terminal includes a specific information setter for setting, in a registration message, specific information previously agreed on with a recipient and transmitting the registration message to the communication server, a conversion data memory for receiving conversion data relating to the receiving-side client terminal from the communication server and storing the received conversion data, and a session establishment requester for setting the conversion data in a first session establishment request message and transmitting the first session establishment request message to the communication server when establishing a session with the receiving-side client terminal. The communication server includes a conversion data generator for receiving the registration message, generating, based on an originating-side real address which is a real address of the originating-side client terminal and the specific information included in the registration message, the conversion data which the communication server alone can convert to a receiving-side real address which is a real address of the receiving-side client terminal, and transmitting the generated conversion data to the originating-side client terminal, and a session controller for receiving the first session establishment request message, obtaining the receiving-side real address based on the conversion data and the originating-side real address included in the first session establishment request message, and transmitting a second session establishment request message to the receiving-side real address to establish the session between the originating-side client terminal and the receiving-side client terminal.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 illustrates status codes.

DESCRIPTION OF THE PREFERRED EMBODIMENTS

Figure 1:
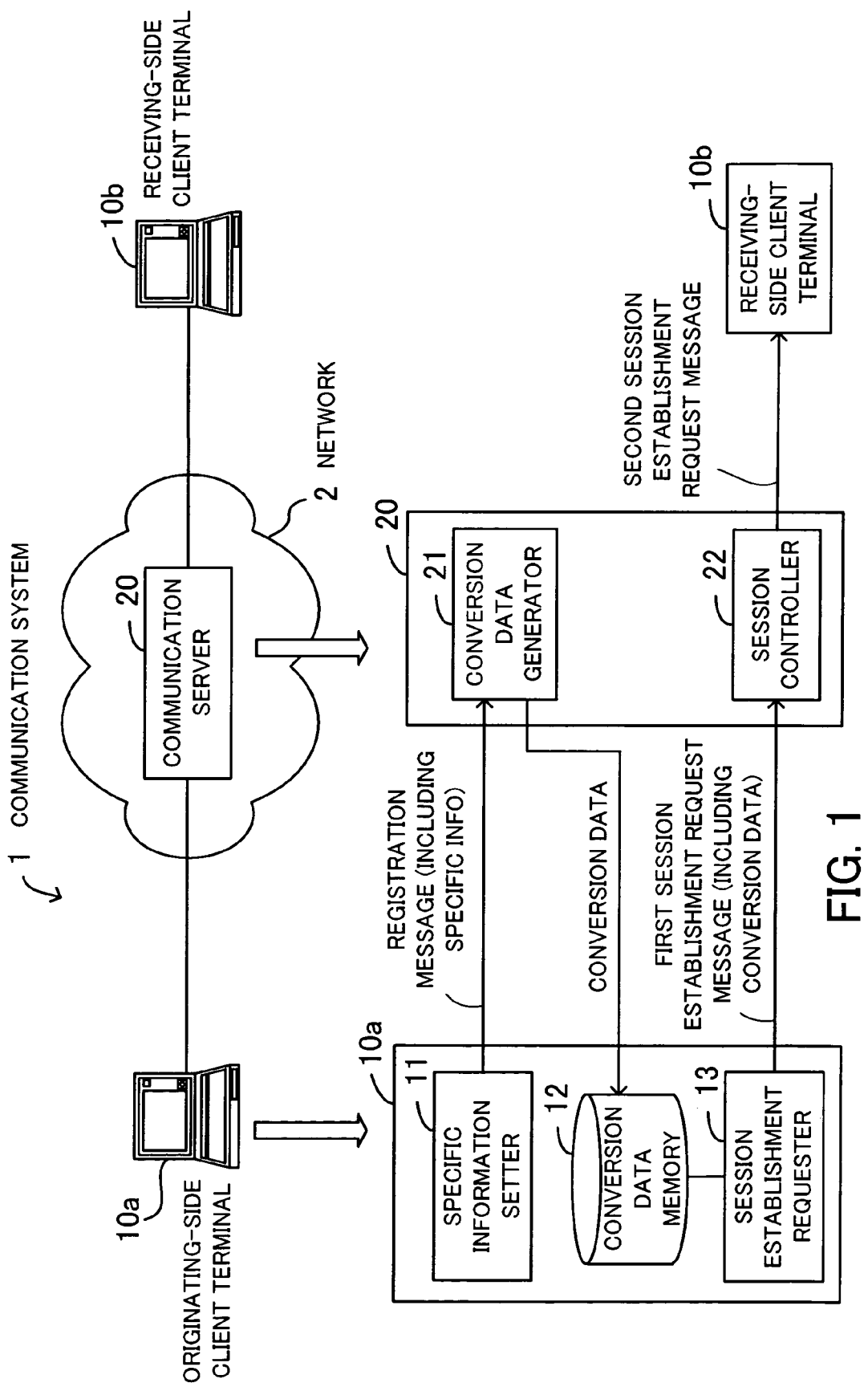
FIG. 1 illustrates the principle of a communication system.

Preferred embodiments of the present invention will be described below with reference to the accompanying drawings. FIG. 1 illustrates the principle of a communication system. The communication system 1 comprises an originating-side client terminal 10a, a receiving-side client terminal 10b and a communication server 20 located within a network 2, and enables the terminals to communicate with each other with a session established therebetween via the network 2.

It should be noted that the client terminals are illustrated separately as the originating-side client terminal 10a and the receiving-side client terminal 10b for convenience' sake only; in practice, each client terminal functions as both the originating-side and receiving-side client terminals.

The originating-side client terminal 10a includes a specific information setter 11, a conversion data memory 12, and a session establishment requester 13. The specific information setter 11 sets specific information previously agreed on with a recipient in a registration message, and transmits the registration message to the communication server 20 located within the network 2.

The conversion data memory 12 receives conversion data relating to the receiving-side client terminal 10b from the communication server 20 and stores the received conversion data. When a session is to be established with the receiving-side client terminal 10b, the session establishment requester 13 sets the conversion data in a first session establishment request message and transmits the message to the communication server 20.

The communication server 20 includes a conversion data generator 21 and a session controller 22. The conversion data generator 21 receives the registration message, and generates, based on an originating-side real address which is the real address of the originating-side client terminal 10a (the real address is an original address uniquely assigned on the network 2) and the specific information included in the registration message, conversion data which the communication server alone can convert to a receiving-side real address which is the real address of the receiving-side client terminal 10b. The conversion data generator then transmits the generated conversion data to the originating-side client terminal 10a.

The session controller 22 receives the first session establishment request message, and obtains the receiving-side real address based on the conversion data and the originating-side real address included in the first session establishment request message.

Then, the session controller transmits a second session establishment request message to the receiving-side real address, to thereby establish a session between the originating-side client terminal 10a and the receiving-side client terminal 10b without directly using the originating-side and receiving-side real addresses uniquely assigned on the network 2.

The expression "without directly using the originating-side and receiving-side real addresses" means that the users of the originating-side and receiving-side client terminals 10a and 10b do not use each other's real addresses when communicating with each other (the users need not know each other's real addresses (resource identification information)).

The communication server 20 is connected with a network operating system, not shown. The network operating system manages, from a remote location, the communication server 20, routers, etc. on the network 2.

Referring now to an exemplary case where the communication system 1 is applied to IP telephony service using SIP as a signaling protocol, the operation of the communication system 1 will be described in detail. First, the flow of an ordinary call control sequence according to SIP and the contents of messages will be outlined with reference to FIGS. 2 and 3.

Figure 2:
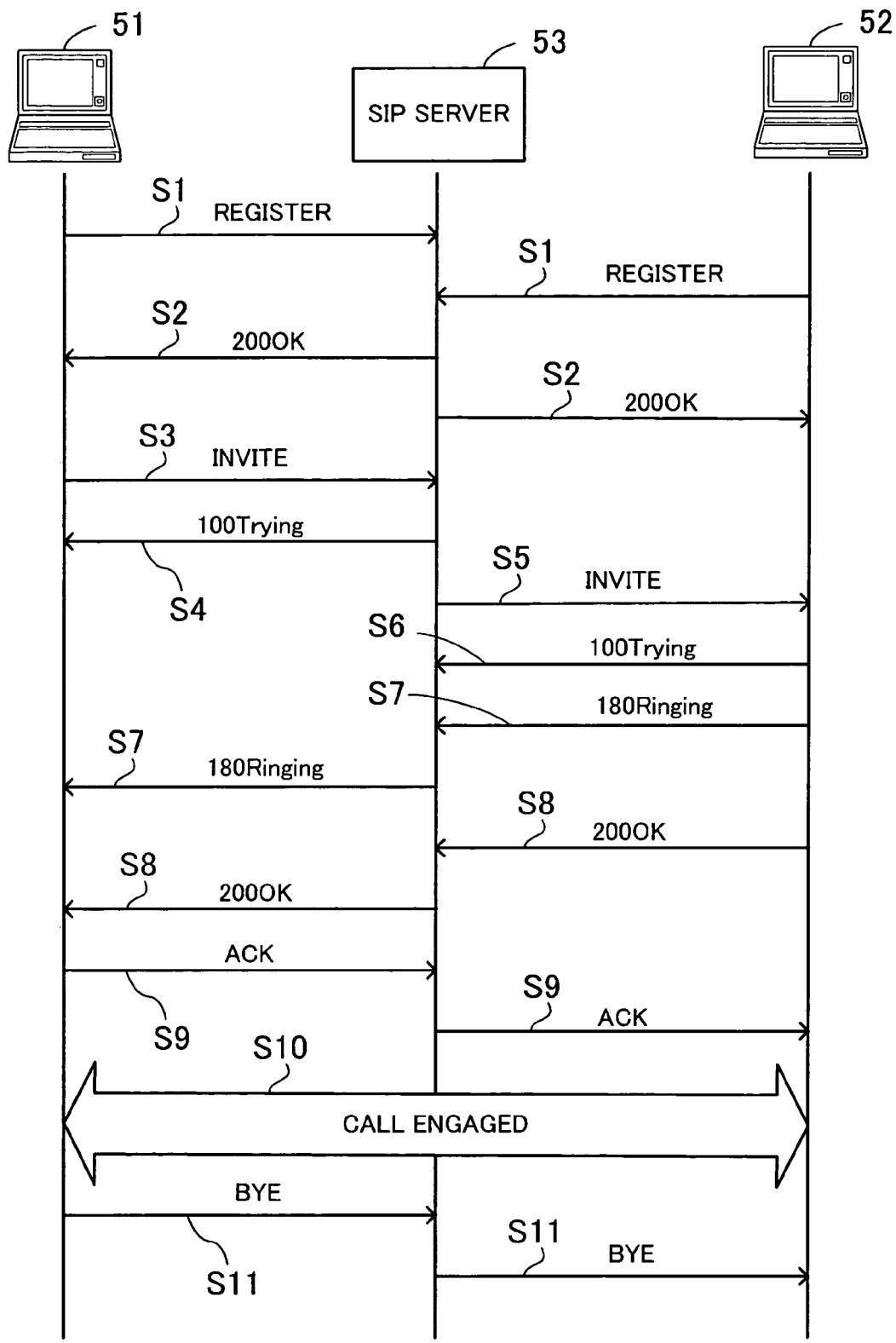
FIG. 2 illustrates a call control sequence according to SIP.

FIG. 2 illustrates the call control sequence according to SIP. As illustrated, a series of steps (registration→establishment of session→call connection→disconnection of session) is executed according to SIP in order to implement IP telephony between terminals 51 and 52 via a SIP server 53.

S1: The terminals 51 and 52 individually transmit a REGISTER message (request message) to the SIP server 53 so as to be registered in the service provided by the server 53.

S2: The SIP server 53 transmits a 200OK message (response message), which is indicative of successful registration, to each of the terminals 51 and 52.

S3: The terminal 51 transmits an INVITE message, as a session establishment request message, to the SIP server 53.

S4: The SIP server 53 transmits a 100Trying message, which is a response message indicating that the server 53 is trying to establish a session, to the terminal 51.

S5: The SIP server 53 transmits an INVITE message, as a session establishment request message, to the terminal 52.

S6: The terminal 52 transmits a 100Trying message, which indicates that the terminal 52 is trying to establish a session, to the SIP server 53.

S7: The terminal 52 transmits a 180Ringing message, which is a response message indicative of a ringing status, to the SIP server 53, which in turn transmits a 180Ringing message to the terminal 51.

S8: When the call is answered by the user of the terminal 52, the terminal 52 transmits a 200OK message to the SIP server 53 as a response and the SIP server 53 transmits a 200OK message to the terminal 51.

S9: The terminal 51 transmits an ACK message, which acknowledges establishment of a session, to the SIP server 53, which in turn transmits an ACK message to the terminal 52 (a session is established as soon as ACK is returned to the called side).

S10: After the session is established, the call is connected between the terminals 51 and 52 via the SIP server 53.

S11: The terminal 51 transmits a BYE message, which is a session disconnection request, to the SIP server 53, which in turn transmits a BYE message to the terminal 52, whereby the session is disconnected and the IP telephony service ends.

In the sequence described above, the numbers "100" and "200" appearing in the names of the messages represent status codes each indicative of the status in response to a request.

FIG. 3 shows such status codes, and the illustrated table T1 shows status code types "1xx" through "6xx". The status code type "100", for example, indicates a "trying" status as a provisional response, and "180" indicates a "ringing" status. The status code type "200" indicates a "successful" status.

Also, the status code "301" indicates that an additional step is required because "there are a plurality of choices", and "400" indicates that the request cannot be fulfilled because the request is an "illegal request". The status code type "500" indicates an "internal server error" as a server error, and "501" indicates a "not implemented" status. The status code type "600" indicates that the request cannot be executed because the server is "busy". In this manner, it is prescribed that a response to a request should include the result represented by a status code.

The following describes in detail the manner of how the communication system 1 operates when IP telephony communication is performed. First, a conversion data acquisition sequence carried out when IP telephony communication is performed using the communication system 1 will be explained.

Figure 4:
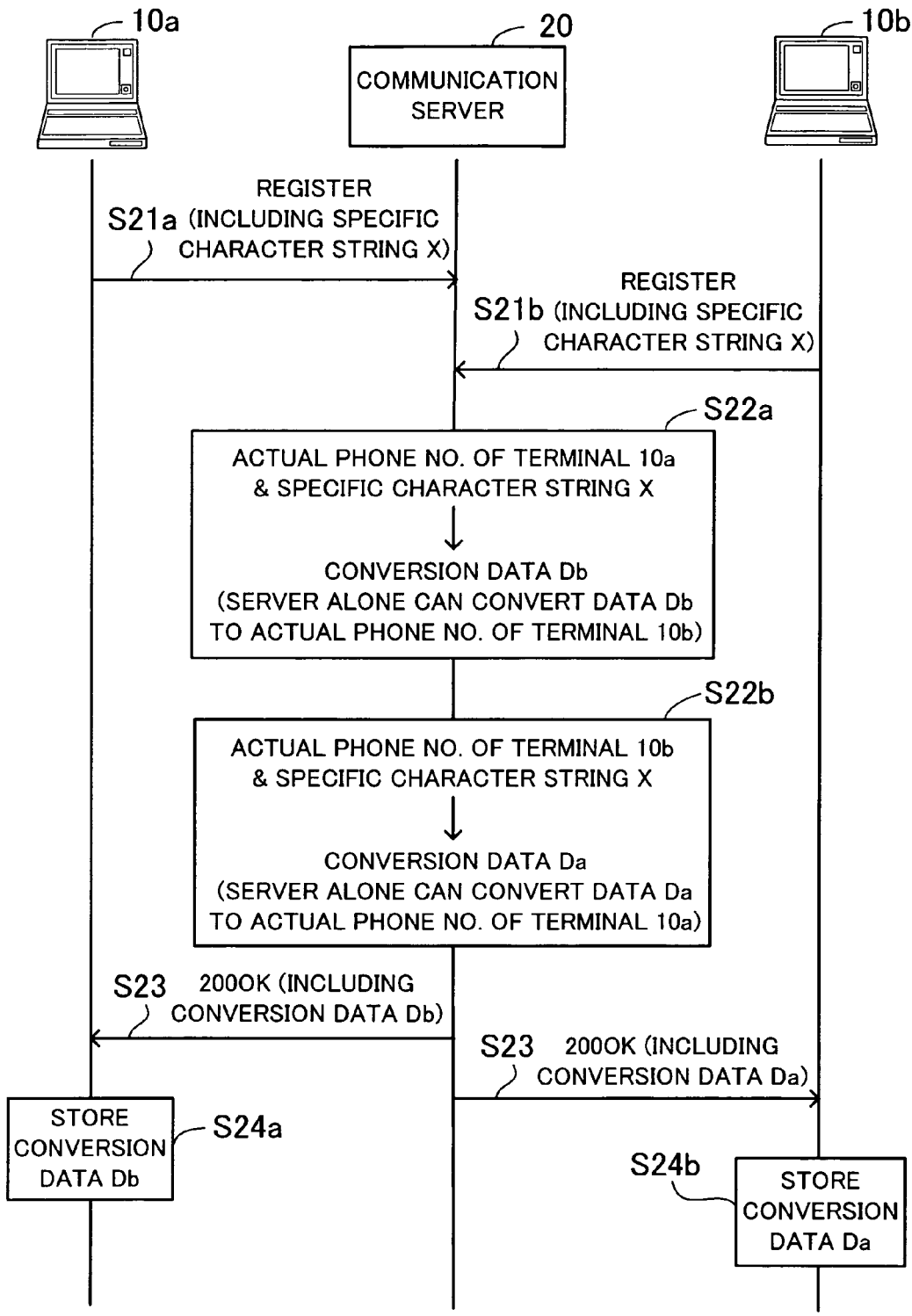
FIG. 4 illustrates a conversion data acquisition sequence.

FIG. 4 illustrates the conversion data acquisition sequence. When IP telephony communication is to be performed between the terminals 10a and 10b via the communication server 20, first, the terminals 10a and 10b individually acquire conversion data from the communication server 20 (as far as the conversion data acquisition is concerned, no distinction needs to be made between the originating side and the receiving side; therefore, in the following, the two terminals are merely referred to as the terminals 10a and 10b, respectively).

Prior to IP telephony communication, the users of the terminals 10a and 10b make an arrangement to determine specific information to be used between the terminals 10a and 10b.

In the following description, it is assumed that a specific character string X is determined as the specific information. The specific information to be used is not limited to a character string and may be data which is held by both of the originating-side client terminal 10a and the receiving-side client terminal 10b. For example, the binary data of a photograph taken on the spot may be exchanged between the originating-side client terminal 10a and the receiving-side client terminal 10b by infrared communication etc. and the thus-shared data may be used as the specific information.

To make use of the service according to the present invention, the users of the terminals 10a and 10b individually notify in advance the service provider (communication server 20) that the specific character string X has been determined as the specific information to be used between the terminals 10a and 10b (the user of the terminal 10a does not know the actual telephone number of the terminal 10b, and the user of the terminal 10b does not know the actual telephone number of the terminal 10a; therefore, the specific character string X alone is the common information that both parties know).

S21a: The specific information setter 11 of the terminal 10a sets the specific character string X in a REGISTER message, which is a registration message, and transmits the message to the communication server 20.

S21b: The specific information setter 11 of the terminal 10b sets the specific character string X in a REGISTER message as a registration message and transmits the message to the communication server 20.

S22a: The conversion data generator 21 of the communication server 20 generates, based on the actual telephone number of the terminal 10a and the specific character string X set in the REGISTER message, conversion data Db which the server 20 alone can convert to the actual telephone number of the terminal 10b.

S22b: Based on the actual telephone number of the terminal 10b and the specific character string X set in the REGISTER message, the conversion data generator 21 generates conversion data Da which the server 20 alone can convert to the actual telephone number of the terminal 10a. The actual telephone numbers are the telephone numbers used for IP telephony communication and correspond to respective SIP-URIs, or real addresses, of the terminals 10a and 10b.

S23: The conversion data generator 21 of the communication server 20 sets the conversion data Db in a 200OK message and transmits the message to the terminal 10a. Similarly, the conversion data generator sets the conversion data Da in a 200OK message and transmits the message to the terminal 10b.

S24a: The conversion data memory 12 of the terminal 10a stores the conversion data Db.

S24b: The conversion data memory 12 of the terminal 10b stores the conversion data Da.

Figure 5:
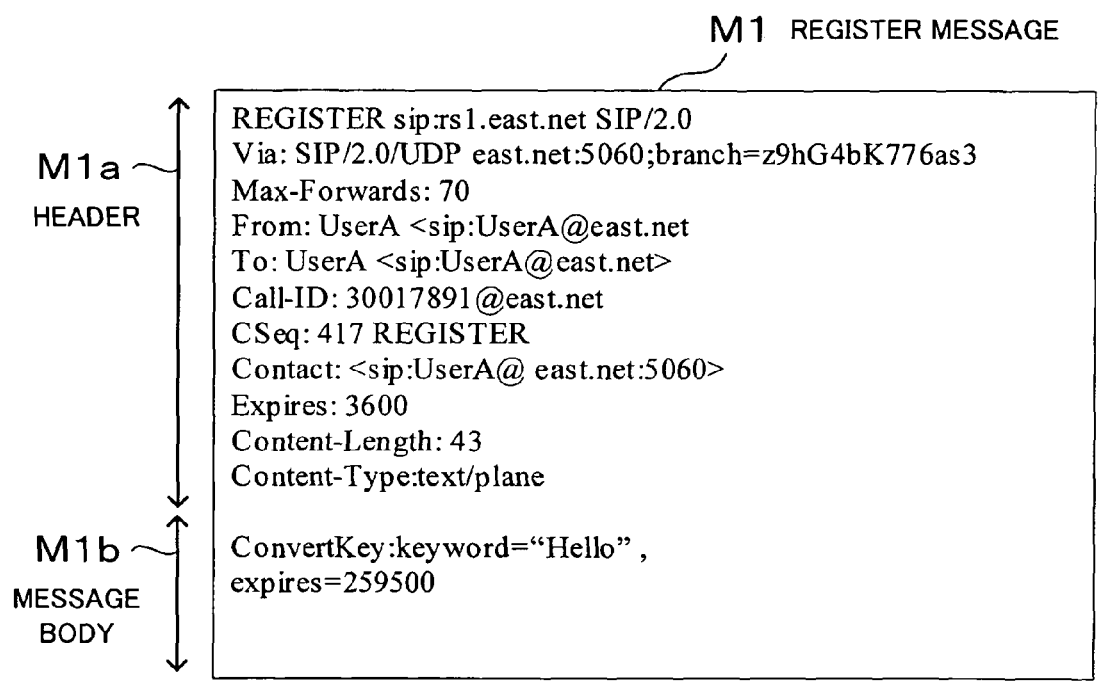
FIG. 5 illustrates contents of a REGISTER message.

FIG. 5 shows the contents of the REGISTER message. The REGISTER message M1 is constituted by a header M1a and a message body M1b. The specific character string X is set next to "ConvertKey" in the message body M1b, and in the illustrated example, "Hello" is defined as the specific character string X. In FIG. 5, "expires" indicates a term of validity and "259500" represents the validity term (in seconds) of the conversion data. The validity term setting will be described later with reference to FIGS. 11 to 13.

Figure 6:
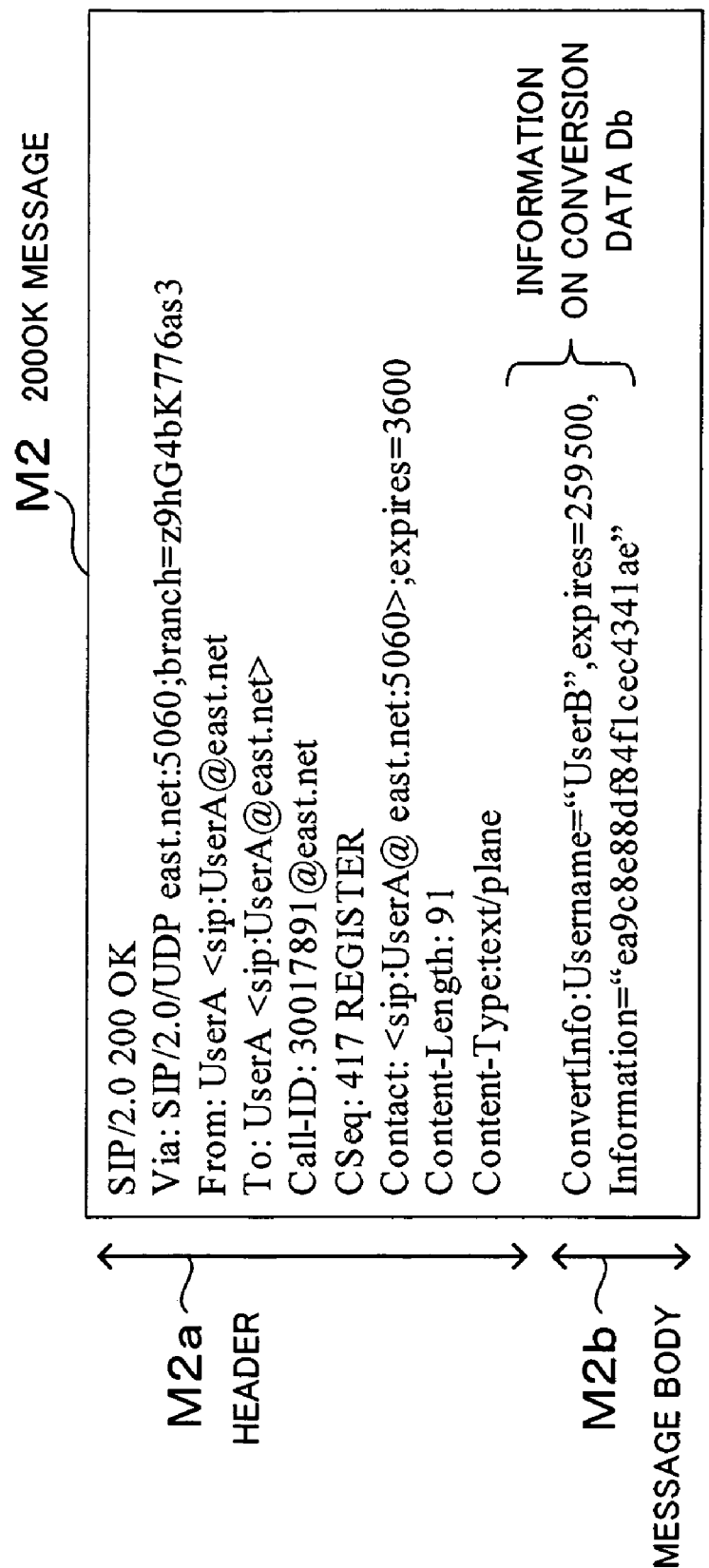
FIG. 6 illustrates contents of a 200OK message.

FIG. 6 shows the contents of the 200OK message. The 200OK message M2 is constituted by a header M2a and a message body M2b. The illustrated 200OK message M2 is the message transmitted from the communication server 20 to the terminal 10a, and information on the conversion data Db is set next to "ConvertInfo" in the message body M2b.

In FIG. 6, the information 'Username="UserB", expires=259500, Information="ea9c8e88df84f1cec4341ae"' is set. This means that the conversion data Db to be used when making an IP telephone call to "UserB" (terminal 10b) is "ea9c8e88df84f1cec4341ae" and that the validity term during which the conversion data Db can be used is "259500" (seconds).

The conversion data Db "ea9c8e88df84f1cec4341ae" is stored in the conversion data memory 12 of the terminal 10a. When an IP telephone call is to be made from the terminal 10a to the terminal 10b, the user of the terminal 10a performs a simple operation on the terminal, whereupon the session establishment requester 13 in the terminal 10a reads out the conversion data Db from the conversion data memory 12, sets the conversion data Db="ea9c8e88df84f1cec4341ae" in an INVITE message, and transmits the message to the communication server 20.

Figure 7:
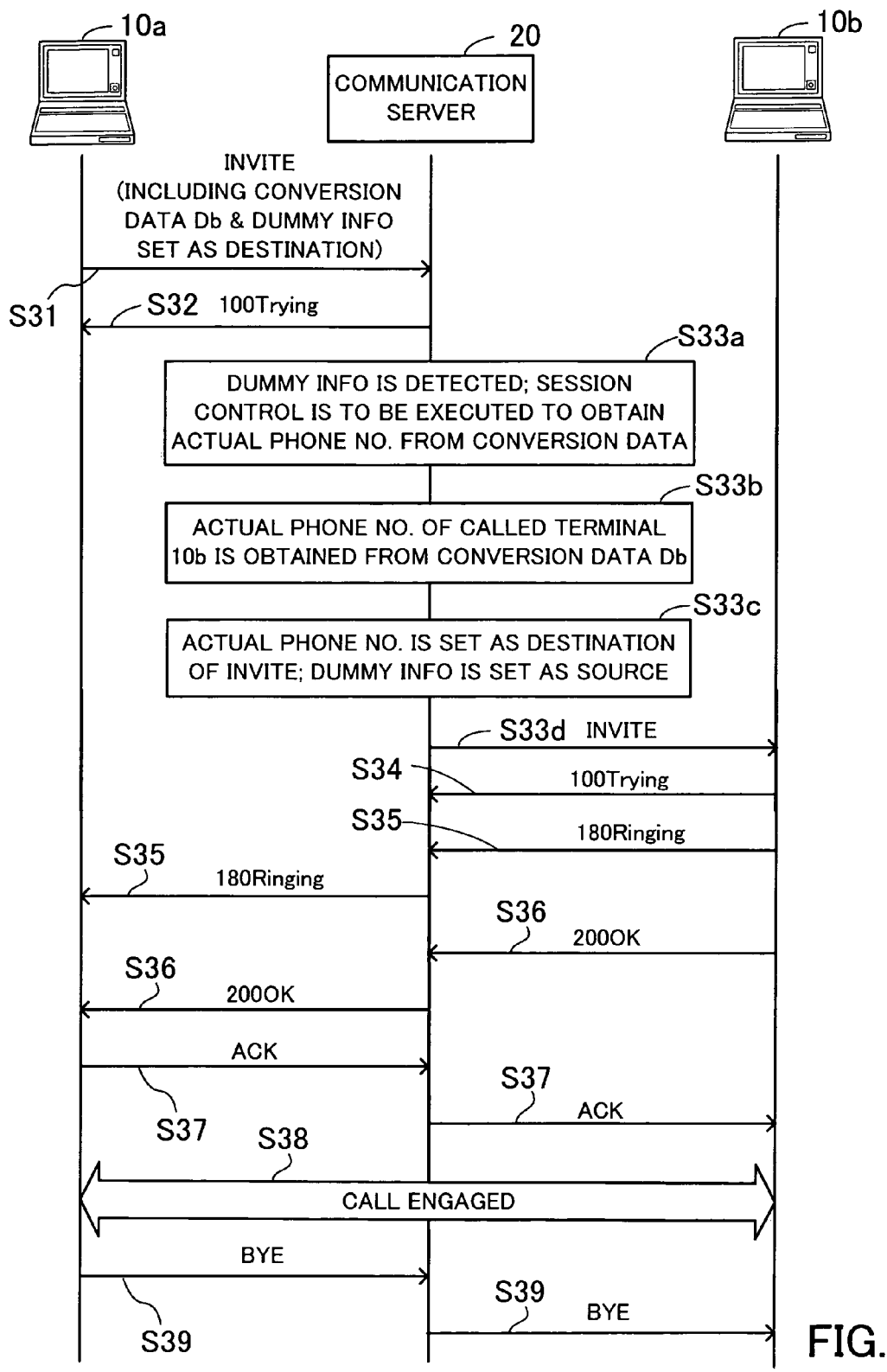
FIG. 7 illustrates a sequence from the establishment of a session to the disconnection of same.

The following describes a series of steps: establishment of session→call connection→disconnection of session, performed between the originating-side client terminal 10a and the receiving-side client terminal 10b after the conversion data is acquired. FIG. 7 illustrates the sequence from the establishment of a session to the disconnection of same.

S31: The session establishment requester 13 of the originating-side client terminal 10a sets the conversion data Db relating to the receiving-side client terminal 10b in an INVITE message (corresponding to the first session establishment request message) for requesting establishment of a session.

Further, dummy information is set in the destination field of the INVITE message. The originating-side client terminal 10a does not hold the actual telephone number of the receiving-side client terminal 10b or any other information identifying the client terminal 10b, and for this reason, dummy information is set in the destination field of the INVITE message (the client is notified of the dummy information from the service provider when using the service of the present invention). The session establishment requester 13 then transmits the INVITE message including the above information to the communication server 20.

S32: The communication server 20 transmits a 100Trying message, which indicates that the server is trying to establish a session, to the originating-side client terminal 10a.

S33a: The session controller 22 of the communication server 20 detects the dummy information set in the destination field of the received INVITE message and recognizes that session control should be executed to obtain an actual telephone number based on the conversion data. Namely, if no dummy information is set in the destination field (if the actual telephone number of a recipient is set in the destination field), ordinary session establishment control is executed; if the dummy information is set in the destination field, the session control according to the present invention is executed to obtain an actual telephone number based on the conversion data.

S33b: Based on the conversion data Db in the INVITE message, the session controller 22 obtains the actual telephone number of the receiving-side client terminal 10b (the manner of how the actual telephone number is derived from the conversion data will be described later with reference to FIG. 10). Then, the session controller deletes the conversion data Db in the INVITE message, to generate a new INVITE message (corresponding to the second session establishment request message) to be transmitted to the receiving-side client terminal 10b.

S33c: The session controller 22 sets the actual telephone number of the receiving-side client terminal 10b, obtained in Step S33b, in the destination field of the INVITE message (corresponding to the second session establishment request message). Also, the session controller sets dummy information in the source field of the INVITE message to conceal the information about the originating-side client terminal 10a (in ordinary IP telephony communication, the actual telephone number (i.e., SIP-URI) of the originating-side client terminal 10a is set in the source field, but in order to conceal the information identifying the originating-side client terminal 10a, the communication server 20 sets dummy information in the source field).

S33d: The session controller 22 transmits the INVITE message generated in Steps 33b and 33c to the receiving-side client terminal 10b.

S34: The receiving-side client terminal 10b transmits a 100Trying message, which indicates that the terminal 10b is trying to establish a session, to the communication server 20.

S35: The receiving-side client terminal 10b transmits a 180Ringing message, which is indicative of a ringing status, to the communication server 20, which in turn transmits a 180Ringing message to the originating-side client terminal 10a.

S36: The user of the receiving-side client terminal 10b answers the call, whereupon the receiving-side client terminal 10b transmits a 200OK message as a response message to the communication server 20, which in turn transmits a 200OK message to the originating-side client terminal 10a.

S37: The originating-side client terminal 10a transmits an ACK message, which acknowledges establishment of a session, to the communication server 20, which in turn transmits an ACK message to the receiving-side client terminal 10b.

S38: After the session is established, the call is connected between the originating-side client terminal 10a and the receiving-side client terminal 10b via the communication server 20.

S39: The originating-side client terminal 10a transmits a BYE message, which is a session disconnection request, to the communication server 20, which then transmits a BYE message to the receiving-side client terminal 10b.

In the SIP messages, detailed session information is described using SDP (Session Description Protocol) defined by RFC2327, and actual telephone conversation is transmitted according to RTP defined by RFC1889, for example.

Figure 8:
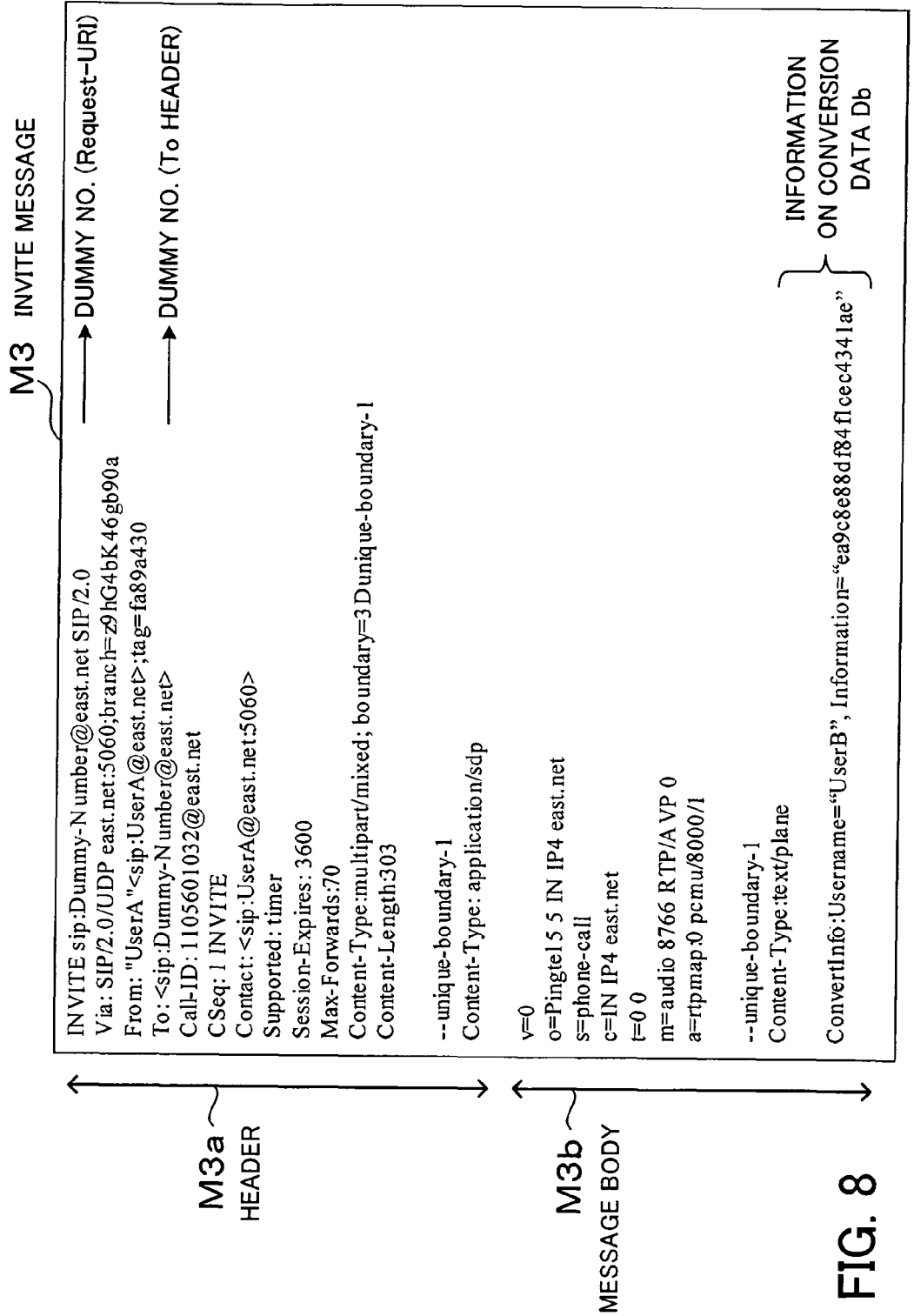
FIG. 8 illustrates contents of an INVITE message.

FIG. 8 shows the contents of the INVITE message (corresponding to the first session establishment request message) transmitted from the originating-side client terminal 10a to the communication server 20. The INVITE message M3 is constituted by a header M3a and a message body M3b.

The destination field corresponds to "Request-URI" and "To" header in the header M3a, and dummy information is set in these fields. In the illustrated example, the dummy information "sip:Dummy-Number@east.net SIP/2.0" is set for the "Request-URI" and the dummy information "<sip:Dummy-Number@east.net>" is set for the "To" header.

Also, information about the conversion data Db 'Username="UserB", Information="ea9c8e88df84f1cec4341ae"' is set next to "ConvertInfo" in the message body M3b.

Figure 9:
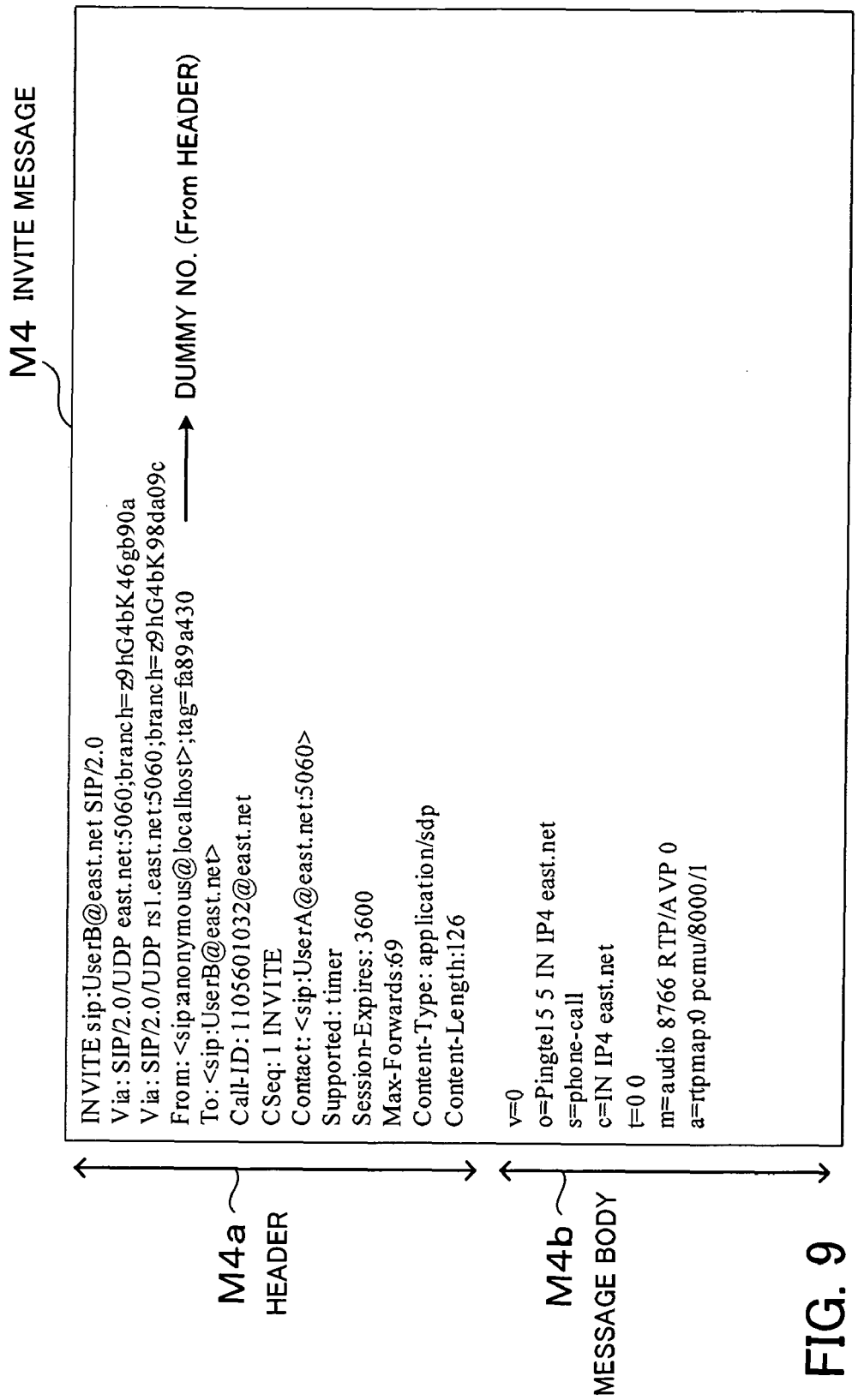
FIG. 9 also illustrates contents of an INVITE message.

FIG. 9 shows the contents of the INVITE message (corresponding to the second session establishment request message) transmitted from the communication server 20 to the receiving-side client terminal 10b. The INVITE message M4 is constituted by a header M4a and a message body M4b.

The INVITE message M4 is generated by deleting the information about the conversion data Db from the message body M3b of the INVITE message M3 and newly setting the necessary information about the receiving-side client terminal 10b in the header M4a.

The source field corresponds to "From" header in the header M4a, and dummy information is set in this field. In the illustrated example, the dummy information "<sip:anonymous@localhost>;tag=fa89a430" is set in the source field.

Figure 10:
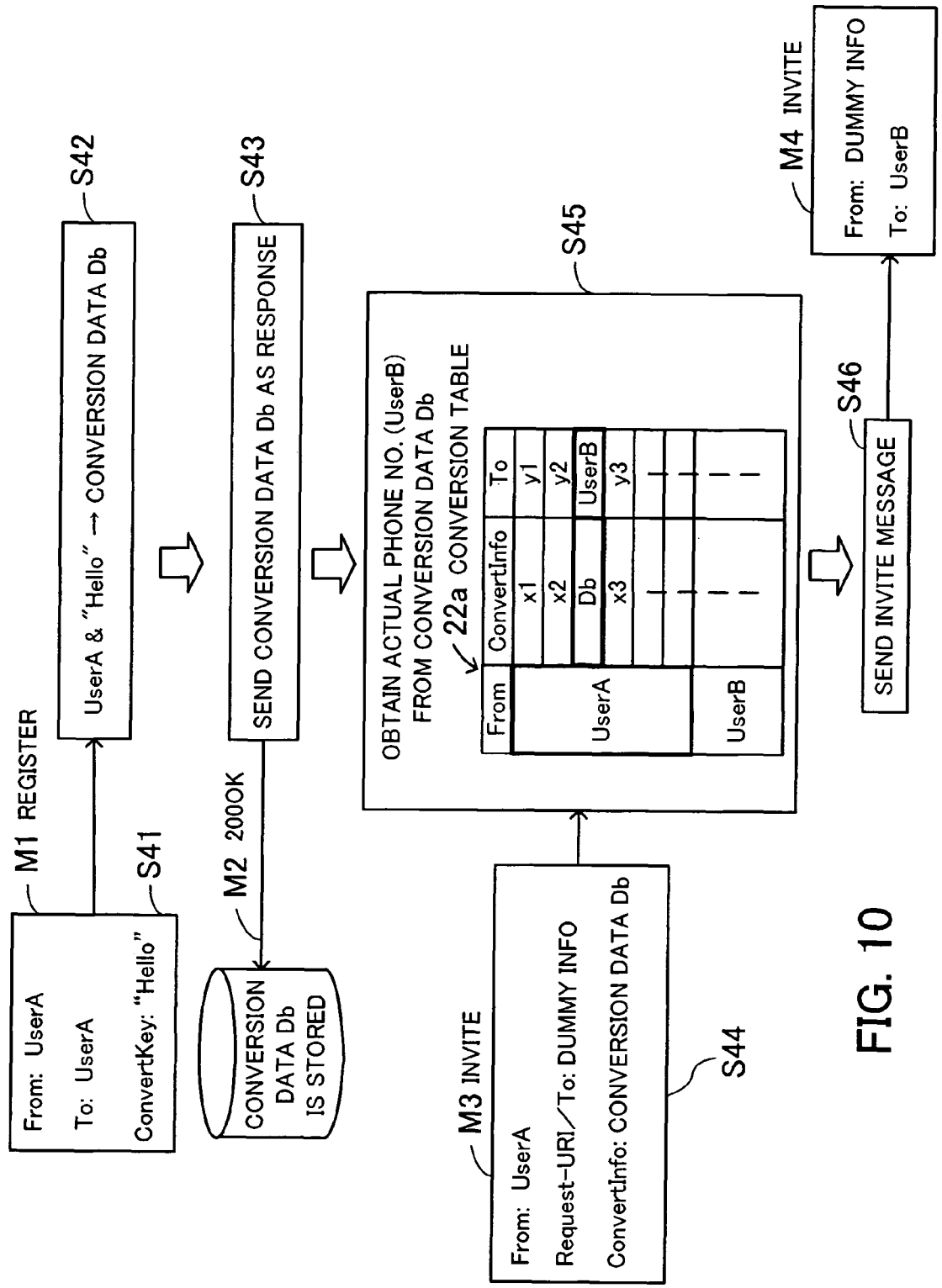
FIG. 10 illustrates the manner of how an actual telephone number is derived from the set information and conversion data in messages.

Referring now to FIG. 10, the manner of how an actual telephone number is derived from the set information and conversion data in the individual messages will be explained. FIG. 10 shows how an actual telephone number is obtained based on the set information and conversion data in the message.

S41: The specific information setter 11 of the originating-side client terminal 10a sets the specific character string (in this example, "Hello") in the REGISTER message M1 and transmits the message to the communication server 20. For the "From" and "To" headers of the REGISTER message M1, the actual telephone number (in this example, "UserA"), that is, the SIP-URI of the originating-side client terminal 10a is set (the source is the originating-side client terminal 10a and the terminal which is to receive a response to the REGISTER request is also the originating-side client terminal 10a; therefore, the actual telephone number "UserA" of the originating-side client terminal 10a is set in both the "From" and "To" headers).

S42: Based on the actual telephone number "UserA" of the originating-side client terminal 10a set in the "From" header of the received REGISTER message M1 and the specific character string "Hello" set next to "ConvertKey" in the message body, the conversion data generator 21 of the communication server 20 generates the conversion data Db which can be converted to the actual telephone number of the receiving-side client terminal 10b only by the communication server 20.

S43: The conversion data generator 21 of the communication server 20 transmits the 200OK message M2 including the conversion data Db to the originating-side client terminal 10a, and the conversion data memory 12 of the client terminal 10a stores the conversion data Db.

S44: When making an IP telephone call to the receiving-side client terminal 10b, the originating-side client terminal 10a transmits the INVITE message M3 to the communication server 20. In this INVITE message M3, the actual telephone number "UserA" of the originating-side client terminal 10a is set in the "From" header, the dummy information is set in the "Request-URI" and the "To" header which are the destination field (since the actual telephone number of the receiving-side client terminal 10*b* is unknown), and the conversion data Db is set in the message body.

S45: The session controller 22 of the communication server 20 has a conversion table 22*a*. The conversion table 22*a* has columns labeled "From" (originating-side actual telephone number), "ConvertInfo" (conversion data) and "To" (receiving-side actual telephone number), and when conversion data is generated by the conversion data generator 21, the generated conversion data and its related data are registered in the conversion table in a manner associated with one another.

On receiving the INVITE message M3, the session controller 22 recognizes that the session control should be executed to obtain an actual telephone number based on the conversion data, since the dummy information is set in the "Request-URI" and the "To" header.

Accordingly, based on the "From (UserA)" and "ConvertInfo (Db)" in the INVITE message M3, the session controller 22 searches the conversion table 22*a* to obtain the actual telephone number (in this example, "UserB") of the receiving-side client terminal 10*b*.

S46: The session controller 22 deletes the conversion data Db from the INVITE message M3 and rewrites the contents of the headers to create a new INVITE message M4, which is then transmitted to the receiving-side client terminal 10*b*. In the INVITE message M4, dummy information is set in the "From" header which is the source field (in order to conceal the actual telephone number of the originating-side client terminal 10*a*) and the actual telephone number "UserB" of the receiving-side client terminal 10*b* is set in the "To" header.

As described above, the IP telephony service using the communication system 1 enables the users of the service to converse with each other with a session established therebetween, without directly using the originating-side and receiving-side actual telephone numbers uniquely assigned to the respective terminals. It is therefore possible to securely prevent illegal use of the actual telephone numbers and enhance the confidentiality of personal information in IP telephony communication.

Comparison will be made here between the aforementioned conventional electronic mail communication using conditional mail addresses and the function of the communication system 1. In the conventional electronic mail communication using conditional mail addresses, users are allotted mail addresses composed of meaningless random character strings, which make the users feel strange and troublesome to tell to other people.

In the communication system 1, on the other hand, the specific information agreed upon between clients is registered, whereupon the communication server 20 generates conversion data which the server 20 alone can recognize and the conversion data is automatically stored in the originating-side and receiving-side terminals.

When the originating-side client makes an IP telephone call to the other client, a message including the specific information has only to be transmitted to the communication server 20, whereby a session is established and the clients can converse with each other over the IP telephone. Thus, not only confidentiality can be enhanced (the originating-side client need not know the actual telephone number of the other client, namely, the clients do not know each other's actual telephone numbers) but very easy-to-use service can be provided to users.

The conversion data, which is stored in the client terminal and which the communication server 20 alone can recognize, may be generated as random binary data, for example, thereby making it difficult for the user to view the conversion data.

Figure 11:
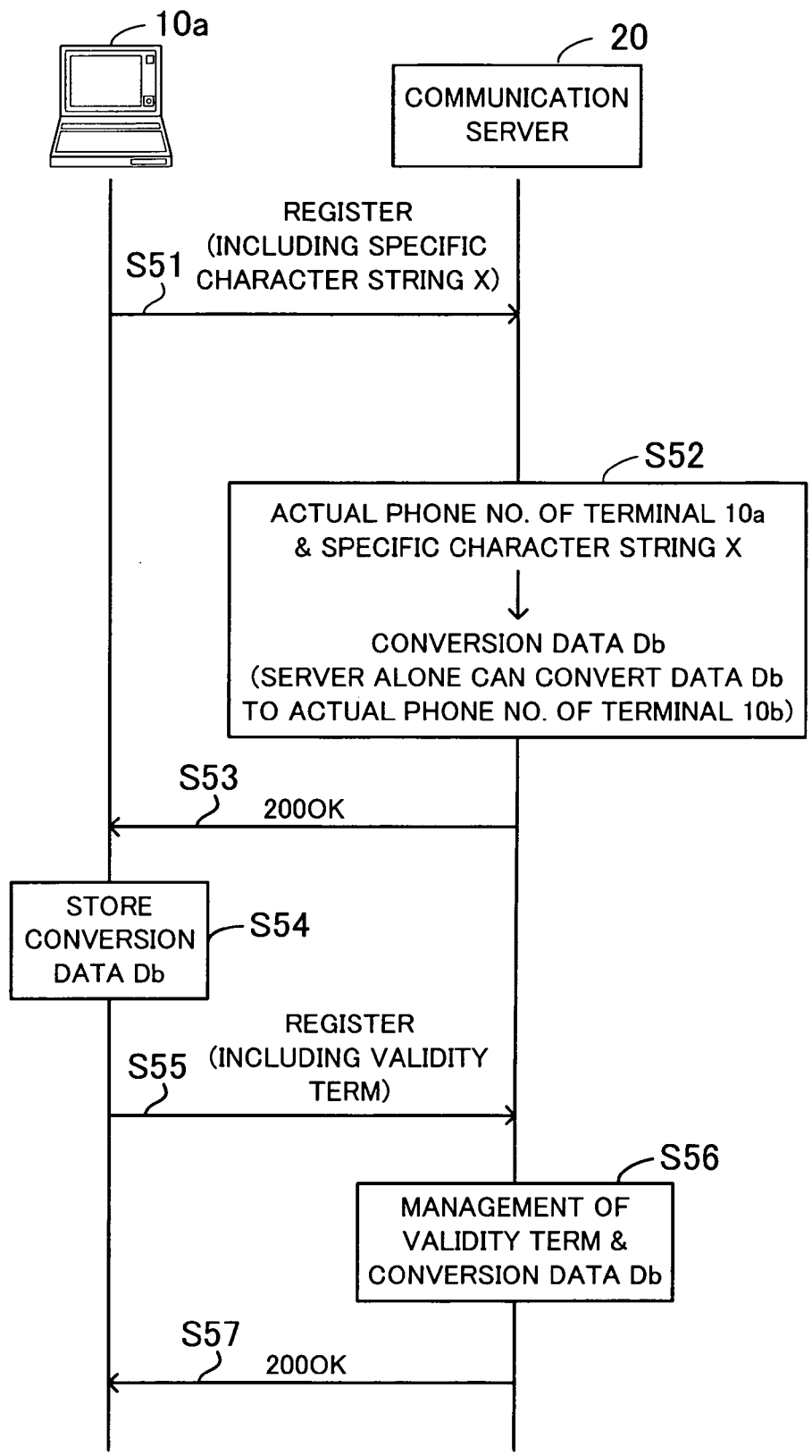
FIG. 11 is a sequence diagram illustrating the manner of setting a term of validity.

The validity term setting for the conversion data will be now described with reference to the sequence diagram of FIG. 11.

S51: The specific information setter 11 of the terminal 10*a* sets the specific character string X in a REGISTER message, which is a registration message, and transmits the message to the communication server 20.

S52: Based on the actual telephone number of the terminal 10*a* and the specific character string X, the conversion data generator 21 of the communication server 20 generates conversion data Db which the local server 20 alone can convert to the actual telephone number of the terminal 10*b* with which the terminal 10*a* is to communicate.

S53: The conversion data generator 21 of the communication server 20 sets the conversion data Db in a 200OK message and transmits the message to the terminal 10*a*.

S54: The conversion data memory 12 of the terminal 10*a* stores the conversion data Db.

S55: The specific information setter 11 of the terminal 10*a* reads out the stored conversion data Db, sets the conversion data Db as well as a desired validity term in a REGISTER message, and again transmits the message to the communication server 20.

S56: On receiving the REGISTER message, the conversion data generator 21 of the communication server 20 sets the validity term in association with the conversion data Db and manages these data.

S57: The conversion data generator 21 of the communication server 20 transmits a 200OK message to the terminal 10*a* to notify same of the completion of validity term setting.

When the validity term of the conversion data is to be updated (including extension and shortening), a REGISTER message having a new validity term set therein may be transmitted to the communication server 20. Also, where the validity term is to be deleted, a message to that effect (e.g., "0" is set in the validity term field) is sent to the communication server 20.

When the REGISTER message including the set validity term is received, the communication server 20 starts the countdown of the validity term as soon as it receives the message or a subsequent instruction to initiate the service, for example (the trigger for starting the countdown of the validity term is not particularly limited), and when the value of the validity term reaches "0", the process of converting the conversion data Db to the actual telephone number is stopped. Namely, the service of IP telephony communication from the terminal 10*a* to the terminal 10*b* is stopped.

In the case where the validity term of the conversion data Da relating to the terminal 10*a*, held by the terminal 10*b*, is longer than that of the conversion data Db held by the terminal 10*a*, even after the service of IP telephony communication from the terminal 10*a* to the terminal 10*b* terminates, the service of IP telephony communication from the terminal 10*b* to the terminal 10*a* remains available for the rest of the validity term (the terminal 10*b* can make an IP telephone call to the terminal 10*a* for the rest of the validity term). Also, the communication server 20 permits users to make inquiries as desired, such as an inquiry about the remaining term of validity.

Figure 12:
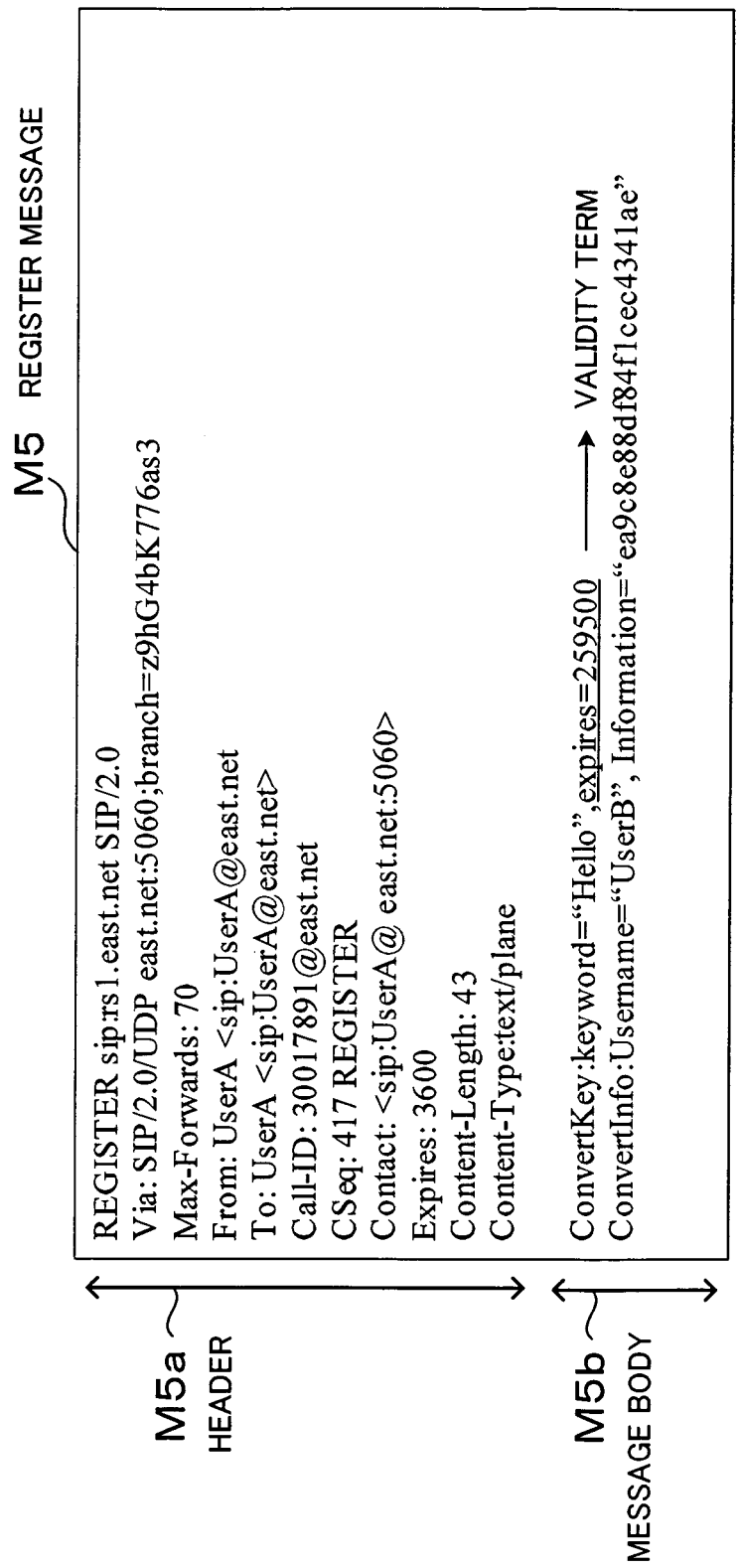
FIG. 12 illustrates contents of a REGISTER message used for updating the validity term.

FIG. 12 shows the contents of a REGISTER message transmitted to update the validity term. The REGISTER message M5 is constituted by a header M5*a* and a message body M5*b*.

In the message body M5b, the validity term-related information (expires=259500) is set in addition to the specific character string-related information (ConvertKey: keyword="Hello") and the conversion data Db-related information (ConvertInfo:Username="UserB", Information="ea9c8e88df84f1cec4341ae"). The information "expires=259500" indicates that the validity term of the conversion data Db is 259,500 seconds.

Figure 13:
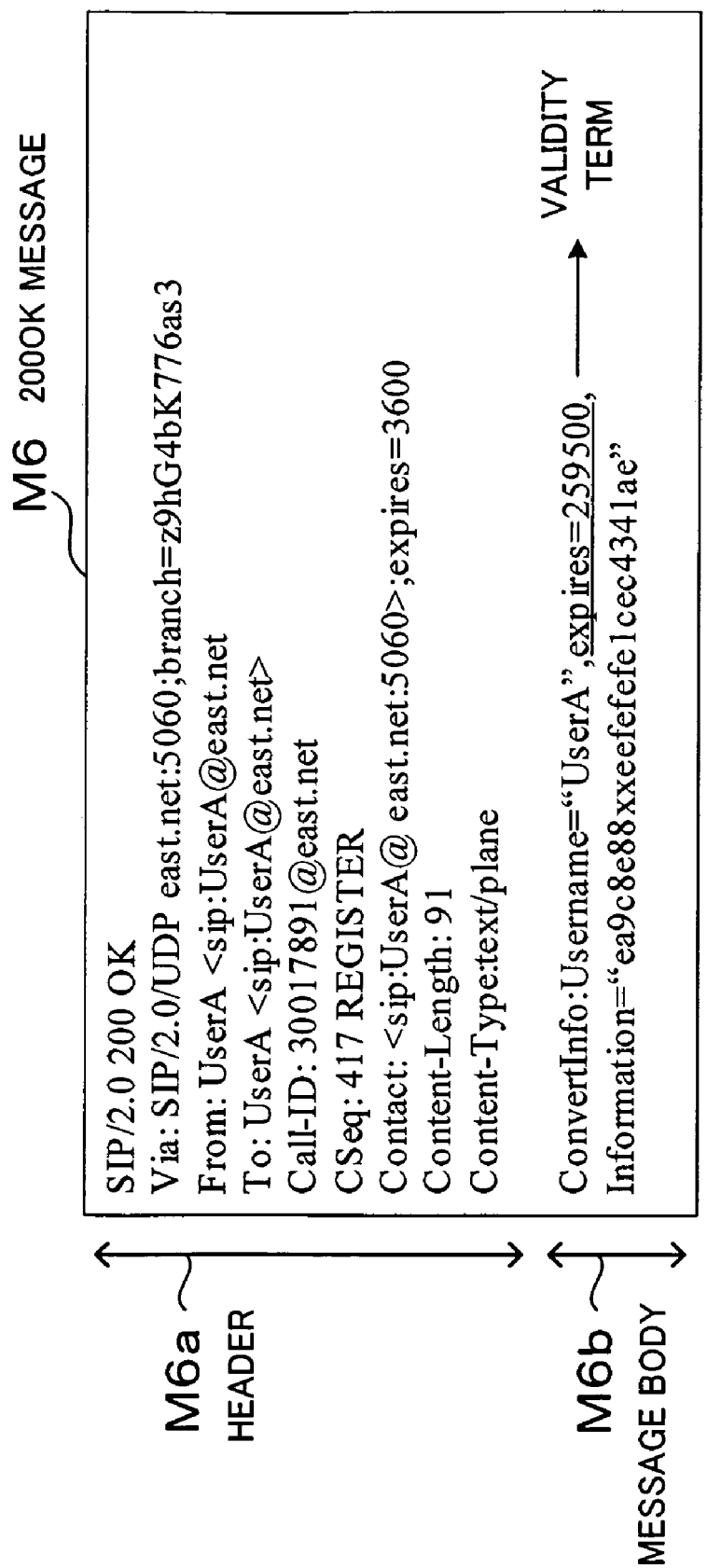
FIG. 13 illustrates contents of a 200OK message used for updating the validity term.
Figure 14:
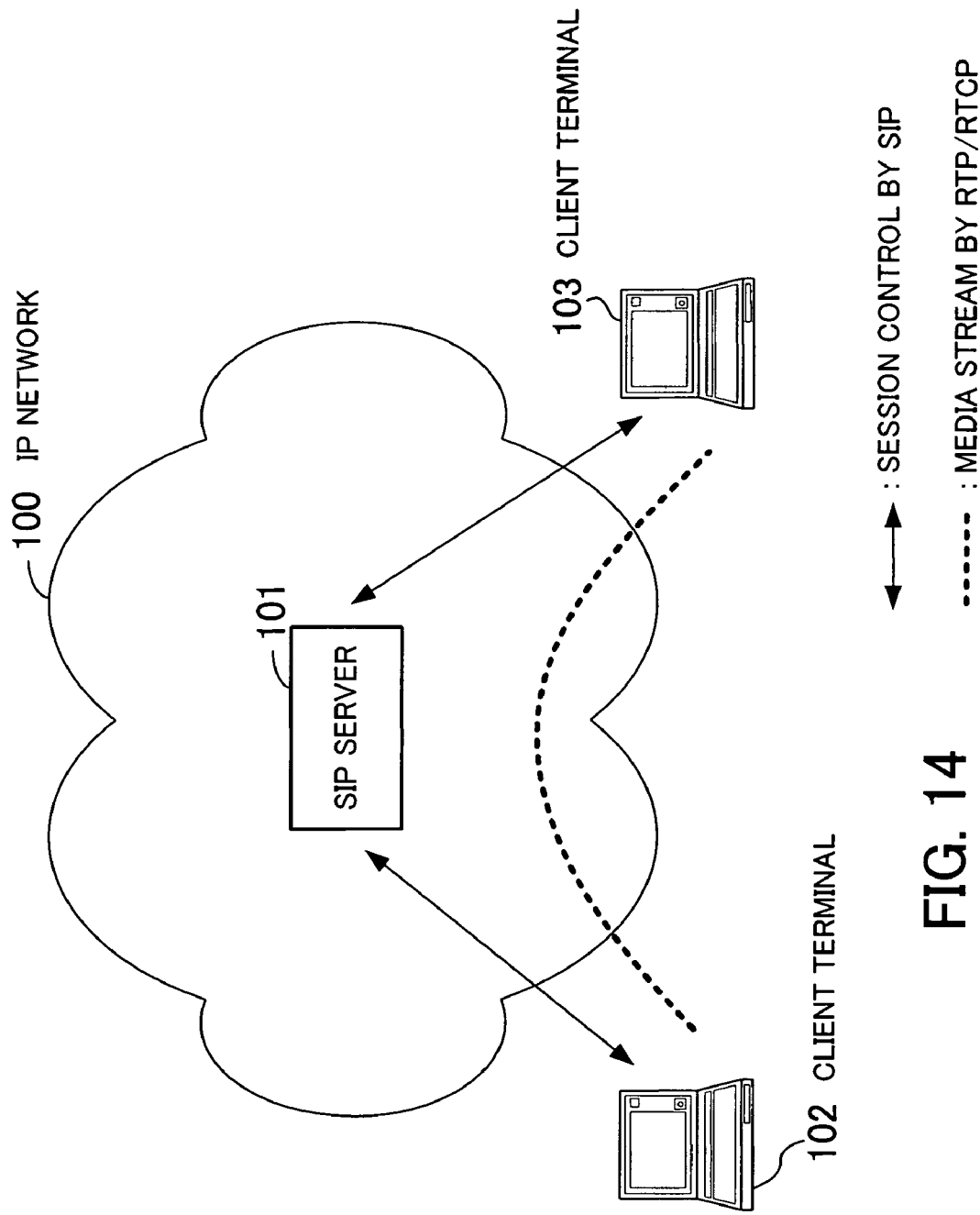
FIG. 14 illustrates a network configuration adapted for IP telephony.

FIG. 13 shows the contents of a 200OK message transmitted when the validity term is updated. The 200OK message M6 is constituted by a header M6a and a message body M6b. In the message body M6b, "expires=259500" is set as a response to the REGISTER message M5. In the case where the validity term has been deleted, a 200OK message whose message body has no content is returned to the client.

As described above, according to the IP telephony communication of the present invention, it is unnecessary for the user of the service to disclose his/her telephone number when communicating with a client whom the user does not know very well, unlike acquaintances. It is therefore possible to avoid an awkward situation where the user encounters attacks because of the disclosure of his/her telephone number to a wicked person and is eventually compelled to change the telephone number.

Also, the client himself can optionally set the validity term during which the client can communicate with the other client (the validity term can also be extended or deleted before the expiry thereof). Accordingly, in the event the other client is found to be a wicked client (or if the address (actual telephone number) is leaked for some reason though the other client does not have malicious intent), the client can immediately shut off the communication with the client in question.

In the foregoing, the process for preventing illegal use of real addresses or actual telephone numbers is explained. The process can of course be applied to the protection of other personal information than real addresses or actual telephone numbers. Also, in the above description, the IP telephony communication based on SIP is explained by way of example. It is to be noted, however, that the protocol to be applied to the communication system 1 is not limited to this particular signaling protocol, and other signaling protocols than SIP, for example, H.323 and H.248/Megaco, can be equally applied to the communication system 1.

In the communication system according to the present invention, conversion data which the communication server alone can convert to the receiving-side real address, which is the real address of the receiving-side client terminal, is generated based on the originating-side real address, which is the real address of the originating-side client terminal, and the specific information. When a session is to be established, the receiving-side real address is obtained based on the conversion data transmitted from the originating-side client terminal, to establish a session between the originating-side client terminal and the receiving-side client terminal without directly using the originating-side and receiving-side real addresses uniquely assigned on the network. This permits a call to be established between the clients without making the clients aware of the real addresses uniquely assigned thereto, whereby illegal use of the real addresses can be securely prevented and thus confidentiality can be enhanced.

According to the session establishment method of the present invention, conversion data which the communication server alone can convert to the receiving-side real address, which is the real address of the receiving-side client terminal, is generated based on the originating-side real address, which is the real address of the originating-side client terminal, and the specific information. When a session is to be established, the receiving-side real address is obtained based on the conversion data transmitted from the originating-side client terminal, to establish a session between the originating-side client terminal and the receiving-side client terminal without directly using the originating-side and receiving-side real addresses uniquely assigned on the network. This permits a call to be established between the clients without making the clients aware of the real addresses uniquely assigned thereto, whereby illegal use of the real addresses can be securely prevented and thus confidentiality can be enhanced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication system for performing communication with a session established between terminals via a network, comprising:

a receiving-side client terminal;

an originating-side client terminal which is to establish a session with the receiving-side client terminal; and a communication server located within the network for establishing the session, wherein the originating-side client terminal includes a specific information for setting, in a registration message, specific information previously agreed on with a recipient and transmitting the registration message to the communication server, a conversion data memory for receiving conversion data relating to the receiving-side client terminal from the communication server and storing the received conversion data, and a session establishment requester for setting the conversion data in a first session establishment request message and transmitting the first session establishment request message to the communication server when establishing a session with the receiving-side client terminal, and the communication server includes a conversion data generator for receiving the registration message, generating, based on an originating-side real address which is a real address of the originating-side client terminal and the specific information included in the registration message, the conversion data which the communication server alone can convert to a receiving-side real address which is a real address of the receiving-side client terminal, and transmitting the generated conversion data to the originating-side client terminal, and a session controller for receiving the first session establishment request message, getting the receiving-side real address from the conversion data and the originating-side real address included in the first session establishment request message, and transmitting a second session establishment request message to the receiving-side real address for establishing the session between the originating-side client terminal and the receiving-side client terminal, wherein the specific information is a character string or binary data of a photograph exchanged between the originating-side client terminal and the receiving-side client terminal by infrared communication, wherein the session establishment requester sets dummy information in a destination field of the first session establishment request message, and the session controller judges, on detecting the dummy information set in the received first session establishment request message, that session control should be executed to obtain the receiving-side real address based on the conversion data, wherein, when the dummy information is not set in the destination field, ordinary session establishment control is executed; when the dummy information is set in the destination field, the session control is executed to obtain the receiving-side real address based on the conversion data, wherein the session controller sets dummy information in a source field of the second session establishment request message in order to conceal information about the originating-side client terminal, and transmits the second session establishment request message to the receiving-side real address.

2. The communication system according to claim 1, wherein the conversion data generator sets, with respect to the conversion data, a validity term optionally set by the originating-side client terminal and allows the validity term to be extended or deleted before expiry thereof.

3. A session establishment method for establishing a session between terminals via a network, comprising:

transmitting, from a specific information of an originating-side client terminal to a communication server located within the network, a registration message in which is set specific information previously agreed on with a recipient;

receiving the registration message by a conversion data generator of the communication server, generating, based on an originating-side real address which is a real address of the originating-side client terminal and the specific information included in the registration message, conversion data which the communication server alone can convert to a receiving-side real address which is a real address of a receiving-side client terminal, and transmitting the conversion data to the originating-side client terminal;

receiving the conversion data relating to the receiving-side client terminal, transmitted from the communication server, and storing the received conversion data in a conversion data memory of the originating-side client terminal;

transmitting, from a session establishment requester of the originating-side client terminal to the communication server, a first session establishment request message including the stored conversion data when a session is to be established with the receiving-side client terminal;

receiving the first session establishment request message by a session controller of the communication server, getting the receiving-side real address from the conversion data and the originating-side real address included in the first session establishment request message, and transmitting a second session establishment request message to the receiving-side real address; and establishing a session between the originating-side client terminal and the receiving-side client terminal, wherein the specific information is a character string or binary data of a photograph exchanged between the originating-side client terminal and the receiving-side client terminal by infrared communication, wherein the session establishment requester sets dummy information in a destination field of the first session establishment request message, and the session controller judges, on detecting the dummy information set in the received first session establishment request message, that session control should be executed to obtain the receiving-side real address based on the conversion data, wherein, when the dummy information is not set in the destination field, ordinary session establishment control is executed; when the dummy information is set in the destination field, the session control is executed to obtain the receiving-side real address based on the conversion data, wherein the session controller sets dummy information in a source field of the second session establishment request message in order to conceal information about the originating-side client terminal, and transmits the second session establishment request message to the receiving-side real address.

4. The session establishment method according to claim 3 wherein the conversion data generator sets, with respect to the conversion data, a validity term optionally set by the originating-side client terminal and allows the validity term to be extended or deleted before expiry thereof.

5. An IP telephony communication establishment method for establishing a session between terminals when IP telephony communication using SIP as a signaling protocol is performed via an IP network, comprising:

transmitting, from a specific information of an originating-side client terminal to a communication server located within the IP network, a REGISTER message in which is set specific information previously agreed on with a recipient;

receiving the REGISTER message by a conversion data generator of the communication server, generating, based on an originating-side actual telephone number which is an actual telephone number of the originating-side client terminal and the specific information included in the REGISTER message, conversion data which the communication server alone can convert to a receiving-side actual telephone number which is an actual telephone number of a receiving-side client terminal, and transmitting the conversion data to the originating-side client terminal;

receiving the conversion data relating to the receiving-side client terminal, transmitted from the communication server, and storing the received conversion data in a conversion data memory of the originating-side client terminal;

transmitting, from a session establishment requester of the originating-side client terminal to the communication server, a first INVITE message including the stored conversion data when a session is to be established with the receiving-side client terminal;

receiving the first INVITE message by a session controller of the communication server, getting the receiving-side actual telephone number from the conversion data and the originating-side actual telephone number included in the first INVITE message, and transmitting a second INVITE message to the receiving-side actual telephone number; and establishing a session of IP telephony communication between the originating-side client terminal and the receiving-side client terminal, without directly using the originating-side and receiving-side actual telephone numbers uniquely assigned on the IP network, wherein the specific information is a character string or binary data of a photograph exchanged between the originating-side client terminal and the receiving-side client terminal by infrared communication, wherein the session establishment requester sets dummy information in a destination field of the first INVITE message, and the session controller judges, on detecting the dummy information set in the received first INVITE message, that session control should be executed to obtain the receiving-side actual telephone number based on the conversion data, wherein, when the dummy information is not set in the destination field, ordinary session establishment control is executed; when the dummy information is set in the destination field, the session control is executed to obtain the receiving-side actual telephone number based on the conversion data, wherein the session controller sets dummy information in a source field of the second INVITE message in order to conceal information about the originating-side actual telephone number, and transmits the second INVITE message to the receiving-side actual telephone number.

6. A communication system for performing communication with a session established between terminals via a network, comprising:

a receiving-side client terminal;

an originating-side client terminal which is to establish a session with the receiving-side client terminal; and a communication server located within the network for establishing the session, wherein the originating-side client terminal includes a specific information for setting, in a registration message, specific information previously agreed on with a recipient and transmitting the registration message to the communication server, a conversion data memory for receiving conversion data relating to the receiving-side client terminal from the communication server and storing the received conversion data, and a session establishment requester for setting the conversion data in a first session establishment request message and transmitting the first session establishment request message to the communication server when establishing a session with the receiving-side client terminal, and the communication server includes a conversion data generator for receiving the registration message, generating, based on an originating-side real address which is a real address of the originating-side client terminal and the specific information included in the registration message, the conversion data which the communication server alone can convert to a receiving-side real address which is a real address of the receiving-side client terminal, and transmitting the generated conversion data to the originating-side client terminal, and a session controller for receiving the first session establishment request message, getting the receiving-side real address from the conversion data and the originating-side real address included in the first session establishment request message, and transmitting a second session establishment request message to the receiving-side real address for establishing the session between the originating-side client terminal and the receiving-side client terminal;

wherein the specific information setter reads out the stored conversion data, sets the conversion data and a desired validity term in a registration message, and again transmits the registration message to the communication server, wherein the conversion data generator starts the countdown of the validity term as soon as the communication server receives the registration message, and when the value of the validity term reaches 0, the process of converting the conversion data to the receiving-side real address is stopped, wherein the specific information is a character string or binary data of a photograph exchanged between the originating-side client terminal and the receiving-side client terminal by infrared communication, wherein the session establishment requester sets dummy information in a destination field of the first session establishment request message, and the session controller judges, on detecting the dummy information set in the received first session establishment request message, that session control should be executed to obtain the receiving-side real address based on the conversion data, wherein, when the dummy information is not set in the destination field, ordinary session establishment control is executed; when the dummy information is set in the destination field, the session control is executed to obtain the receiving-side real address based on the conversion data, wherein the session controller sets dummy information in a source field of the second session establishment request message in order to conceal information about the originating-side client terminal, and transmits the second session establishment request message to the receiving-side real address.

7. A session establishment method for establishing a session between terminals via a network, comprising:

transmitting, from a specific information of an originating-side client terminal to a communication server located within the network, a registration message in which is set specific information previously agreed on with a recipient;

receiving the registration message by a conversion data generator of the communication server, generating, based on an originating-side real address which is a real address of the originating-side client terminal and the specific information included in the registration message, conversion data which the communication server alone can convert to a receiving-side real address which is a real address of a receiving-side client terminal, and transmitting the conversion data to the originating-side client terminal;

receiving the conversion data relating to the receiving-side client terminal, transmitted from the communication server, and storing the received conversion data in a conversion data memory of the originating-side client terminal;

transmitting, from a session establishment requester of the originating-side client terminal to the communication server, a first session establishment request message including the stored conversion data when a session is to be established with the receiving-side client terminal;

receiving the first session establishment request message by a session controller of the communication server, getting the receiving-side real address from the conversion data and the originating-side real address included in the first session establishment request message, and transmitting a second session establishment request message to the receiving-side real address; and establishing a session between the originating-side client terminal and the receiving-side client terminal;

wherein the specific information setter reads out the stored conversion data, sets the conversion data and a desired validity term in a registration message, and again transmits the registration message to the communication server, wherein the conversion data generator starts the countdown of the validity term as soon as the communication server receives the registration message, and when the value of the validity term reaches 0, the process of converting the conversion data to the receiving-side real address is stopped, wherein the specific information is a character string or binary data of a photograph exchanged between the originating-side client terminal and the receiving-side client terminal by infrared communication, wherein the session establishment requester sets dummy information in a destination field of the first session establishment request message, and the session controller judges, on detecting the dummy information set in the received first session establishment request message, that session control should be executed to obtain the receiving-side real address based on the conversion data, wherein, when the dummy information is not set in the destination field, ordinary session establishment control is executed; when the dummy information is set in the destination field, the session control is executed to obtain the receiving-side real address based on the conversion data, wherein the session controller sets dummy information in a source field of the second session establishment request message in order to conceal information about the originating-side client terminal, and transmits the second session establishment request message to the receiving-side real address.

* * * * *